[12] United States Patent
Wang et al.

(10) Patent No.: US 9,313,659 B2
(45) Date of Patent: Apr. 12, 2016

(54) AUTHENTICATION AND AUTHORIZATION OF COGNITIVE RADIO DEVICES

(75) Inventors: Jianfeng Wang, Eindhoven (NL); Monisha Ghosh, Eindhoven (NL)

(73) Assignee: KONINKLIJKE PHILIPS N.V., Eindhoven (NL)

(*) Notice: Subject to any disclaimer, the term of this patent is extended or adjusted under 35 U.S.C. 154(b) by 191 days.

(21) Appl. No.: 13/976,487

(22) PCT Filed: Jan. 12, 2012

(86) PCT No.: PCT/IB2012/050151
§ 371 (c)(1),
(2), (4) Date: Jun. 27, 2013

(87) PCT Pub. No.: WO2012/098481
PCT Pub. Date: Jul. 26, 2012

(65) Prior Publication Data
US 2013/0303128 A1    Nov. 14, 2013

Related U.S. Application Data

(60) Provisional application No. 61/434,524, filed on Jan. 20, 2011.

(51) Int. Cl.
*H04W 12/06* (2009.01)
*H04L 29/06* (2006.01)
(Continued)

(52) U.S. Cl.
CPC .......... *H04W 12/06* (2013.01); *H04L 63/0876* (2013.01); *H04W 48/02* (2013.01); *H04W 80/02* (2013.01)

(58) Field of Classification Search
CPC ... H04L 63/0876; H04W 12/06; H04W 48/02

USPC .......................................................... 455/411
See application file for complete search history.

(56) References Cited

U.S. PATENT DOCUMENTS 7,366,498 B2 *  4/2008  Ko ..................... H04L 12/2803
                                                    455/411
7,636,549 B2 * 12/2009  Ma ....................... G06F 19/327
                                                    455/41.2
(Continued)

FOREIGN PATENT DOCUMENTS

WO    WO2004040937 A1    5/2004

OTHER PUBLICATIONS

Anonymous: "Standard ECMA-392. MAC and PHY for Operation in TV White Space". Ecma International, Dec. 1, 2009. p. 190PP, XP002675330, http://www.ecma-international.org/publications/files/ECMA-ST/ECMA-392.pdf.
(Continued)

*Primary Examiner* — Qun Shen
(74) *Attorney, Agent, or Firm* — Larry Liberchuk

(57) ABSTRACT

A method (300) of authentication and authorization of cognitive radio devices comprises generating a registration request message (S320); sending the registration request to a spectrum manager; receiving a registration response message from the spectrum manager (S330); generating an authorization request message (S360); upon receiving of an authorization response message, generating a verification response message (S370); and sending the verification response message to the cognitive radio device to be authenticated, such that the cognitive radio device is authenticated and authorized to communicate on channels designated in the verification response message (S380).

9 Claims, 6 Drawing Sheets

(51) Int. Cl.
  *H04W 48/02* (2009.01)
  *H04W 80/02* (2009.01)

(56) References Cited

U.S. PATENT DOCUMENTS

| | | | |
|---|---|---|---|
| 8,447,861 B2 | 5/2013 | Sawai | |
| 8,750,796 B2* | 6/2014 | Claus et al. | 455/41.2 |
| 2004/0203384 A1* | 10/2004 | Sugikawa | H04W 12/06 455/41.2 |
| 2005/0120246 A1* | 6/2005 | Jang et al. | 713/201 |
| 2007/0106894 A1* | 5/2007 | Zhang et al. | 713/170 |
| 2007/0226779 A1* | 9/2007 | Yokomitsu | H04L 9/0869 726/2 |
| 2007/0234038 A1* | 10/2007 | Jin | 713/155 |
| 2008/0221951 A1 | 9/2008 | Stanforth | |
| 2009/0232041 A1* | 9/2009 | Smith | H04L 1/1867 370/312 |
| 2010/0056132 A1 | 3/2010 | Gallagher | |
| 2011/0098043 A1* | 4/2011 | Yu et al. | 455/435.1 |
| 2011/0138183 A1* | 6/2011 | Reddy | H04K 3/25 713/169 |
| 2011/0167270 A1* | 7/2011 | Lee | H04L 9/0869 713/170 |

OTHER PUBLICATIONS

Google Inc.: "Proposal by Google inc. to Provide a TV Band Device Database Management Solution", Unlicensed Operation in the TV Broadcast Bands, Jan. 4, 2010, XP002675331, URL:http://apps.fcc.g0v/ecfs//d0cument/view.action?id=7020355207.

* cited by examiner

| Secure Sync IE 400 ||
|---|---|
| Element ID | 401 |
| Length | 402 |
| Multicast ID | 403 |
| Channel Set ID | 404 |
| Channel Set IE | 405 |

FIG. 4A

| Channel Set IE 405 ||
|---|---|
| Element ID | 410 |
| Length | 420 |
| Regulatory domain | 430 |
| Number of Channels | 440 |
| Channel No. 441 | TX Power Limit 442 |

FIG. 4B

AUTHENTICATION AND AUTHORIZATION OF COGNITIVE RADIO DEVICES

This patent application claims the priority benefit under 35 U.S.C. §119(e) of U.S. Provisional Application No. 61/434,524 filed on Jan. 20, 2011 the contents of which are herein incorporated by reference.

The invention generally relates to wireless communication devices and, more particularly, to authentication and authorization of cognitive devices in wireless networks.

Cognitive devices are being developed in order to use white space frequencies (for example, frequencies available due to the termination of analog TV and a limited number of TV bands being used in a certain geographical location) to provide wireless broadband Internet access. However, transmission on such frequencies may impact incumbent services, such as TV stations and other wireless users.

Some regulatory agencies, such as the Federal Communications Commission (FCC) in the USA and Ofcom in the UK, set some regulations that require the authentication and authorization of cognitive radio devices prior to any transmission by such device. For example, the FCC requires a cognitive radio device to contact a designated spectrum database, either directly or indirectly, to determine its operating channels and transmission powers before and during its operation.

According to the FCC regulations, a Mode I personal/portable TV band device (TVBD) may only transmit data upon receiving a list of permissible channels from a Mode II TVBD (hereinafter Mode II) device. The Mode II device queries the spectrum database and verify that a FCC identifier (FCC ID) of the Mode I device is valid. To initiate a communication with a Mode II device, the Mode I device may transmit on an available channel used by the Mode II or on a channel indicated by the Mode II device as available for communication. At least once every 60 seconds, except when in sleep mode, a Mode I device receives a contact verification signal from the Mode II device that includes its current list of available channels. Alternatively, the Mode I device contacts the Mode II device to re-verify/re-establish channel availability.

A contact verification signal is an encoded signal broadcast by a Mode II device for reception by Mode I devices to which a list of available channels for operation is provided. The contact verification signal is also utilized to determine if a Mode I device is still within the reception range of the Mode II device. A Mode I device may respond only to a contact verification signal from the Mode II device that provided the list of available channels on which it operates. A Mode II device provides, together with a list of available channels, information to decode the contact verification signal at the same time it provides the list of available channels.

Further according to the FCC regulations, a Mode I device ceases its operation immediately when a contact verification signal is not received or when it is not able to re-establish a list of available channels through contact with a Mode II device. In addition, if a Mode I device loses power it must re-check or re-establish the communication with a Mode II device to obtain a list of available channels. If a Mode II device loses power and obtains a new channel list thereafter, it must signal all of the associated Mode I devices to acquire a new channel list. A cognitive radio can access the spectrum database either directly or indirectly to determine its operating channels as well as operation powers before and during operation.

Currently, communication standards that support cognitive radio networks, such as Ecma 392, IEEE 802.22, and IEEE 802.11af, do not define any efficient method for performing such authentication and authorization of devices. Therefore, it would be advantageous to provide an efficient method and device for employing the regulations discussed above in wireless networks that include cognitive radio devices.

Certain embodiments of the invention include a method of authentication and authorization of cognitive radio devices. The method comprises generating a registration request message, the registration request message includes an identifier and a location of a device generating the request and a location and an identifier of at least one cognitive radio device to be authenticated; sending the registration request to a spectrum manager; receiving a registration response message, wherein the registration response message includes an encrypted authentication signal that can only be decoded by the cognitive radio device to be authenticated; generating an authorization request message that includes a decrypted authentication signal authentication as received from the device to be authenticated; upon receiving the authorization response message, generating a verification response message, wherein the verification response message includes at least a list of available channels and transmission power limits set for the device to be authenticated; and sending the verification response message to the cognitive radio device to be authenticated, such that the cognitive radio device is authenticated and authorized to communicate on channels designated in the verification response message.

Certain embodiments of the invention also include a cognitive radio device for authentication and authorization of a plurality of slave devices operable in a cognitive-based wireless network. The cognitive radio device comprises a memory unit including at least a read-only memory portion for storing an identity of the cognitive radio device and its private security key, the memory unit further storing a list of associated cognitive radio slave devices; a processor for generating at least a registration request message, an association response message, a verification response message, a secure sync information element (IE), and a refresh request message; and a communication module for exchanging the generated messages with a spectrum manager and the associated cognitive radio devices.

Certain embodiments of the invention also include a cognitive radio device operable in a cognitive-based wireless network. The device comprises a memory unit including at least a read-only memory portion for storing an identity of the device and its private security key; a processor for generating at least an association request, a verification request message, wherein the association request includes at least an identifier, a location, and a MAC address of the cognitive radio device, the verification request message includes at least a decrypted authentication signal decrypted using the private security key; and a communication module for exchanging the generated messages with a spectrum manager and a master device.

Certain embodiments of the invention also include a spectrum manager for authentication and authorization of operable cognitive radio device in a cognitive-based wireless network. The spectrum manager comprises a database for storing an identity, characteristics, a list of permissible channels, and transmission power limits defined for each of the cognitive radio device; a processor for generating at least a registration response message, an authorization response, and a refresh response message, wherein the registration response includes at least an encrypted authentication signal, the response message being generated if the authentication signal included in the authorization request message matches a decrypted copy of the authentication signal included in the registration response message, the refresh response message including at least an updated list of the permissible channels;

and a communication module for exchanging the generated messages with one or more cognitive radio devices operable as a master device.

The subject matter that is regarded as the invention is particularly pointed out and distinctly claimed in the claims at the conclusion of the specification. The foregoing and other features and advantages of the invention will be apparent from the following detailed description taken in conjunction with the accompanying drawings.

FIGS. 4A and 4B illustrate the structures of the Secure Sync IE and Channel Set IE flow diagram illustrating a method of authentication and authorization of a slave device in accordance with an embodiment of the invention.

Figure 1:
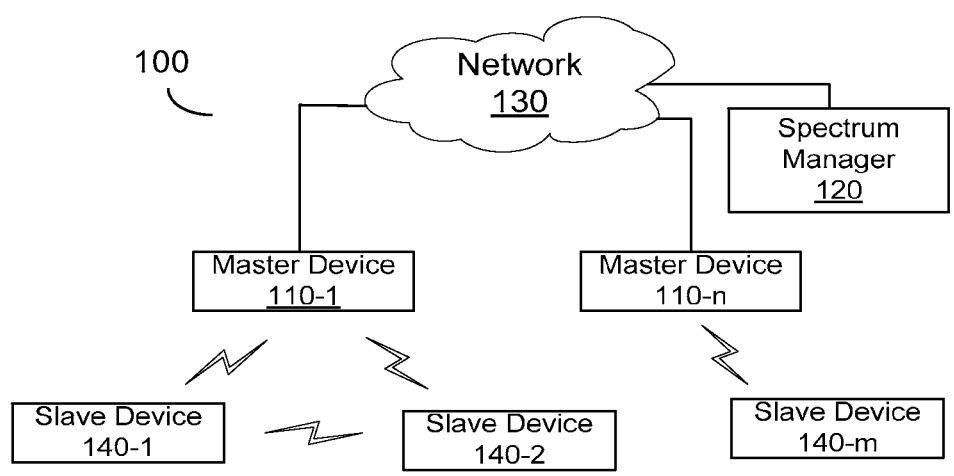
FIG. 1 is a diagram of a cognitive radio based network utilized for describing various embodiments of the invention.

It is important to note that the embodiments disclosed by the invention are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in plural and vice versa with no loss of generality. In the drawings, like numerals refer to like parts through several views.

FIG. 1 shows a non-limiting and exemplary diagram of a network system 100 for supporting cognitive radio devices. In the network system 100 a plurality of master devices 110-1 through 110-$n$ communicate with a spectrum manager 120 through a network 130. The network 130 may be, but is not limited to, a wide area network, a local area network, and the like, or any combination thereof.

The master devices 110-1 through 110-$n$ further communicate with a plurality of slave devices 140-1 through 140-$m$. Each master device (e.g., master device 110-$j$) authenticates itself and its associated slave devices (e.g., slave device 140-$i$) and retrieves a list of authorized frequency channels and operation power for itself and its associated slave devices from the spectrum manager 120. The master devices 110-1 through 110-$n$ also coordinate dynamic frequency selection (DFS), transmit power control (TPC), and channel measurements on behalf of slave devices 140-1 through 140-$m$.

The master and slave devices in the network system 100 are cognitive radio devices that implement a communication standard including, but not limited to, Ecma 392, IEEE 802.22, IEEE 802.11af, and the like. In accordance with an embodiment of the invention, a slave device 140-$i$ is a Mode I TVBD device, and a master device 110-$j$ is a fixed or Mode II TVBD device ($i=1, \ldots, m$ and $j=1, \ldots n$) as defined by the FCC regulations. As a non-limiting example, a slave device 140-$i$ may be a handheld device, such as a smartphone, a laptop computer, a tablet computer, and the like. A master device 110-$j$ may be an access point operable in a wireless LAN.

Figure 2:
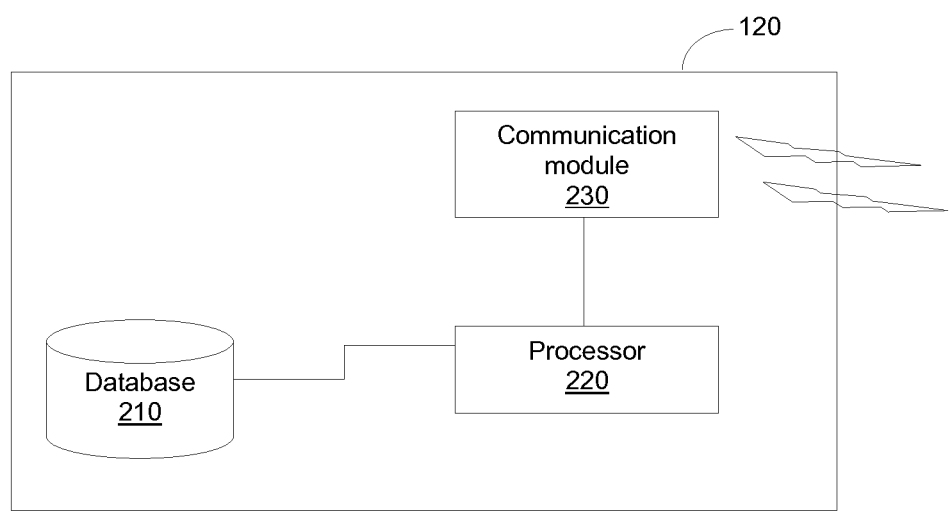
FIG. 2 is a block diagram of the spectrum manager.

As illustrated in FIG. 2, the spectrum manager 120 includes a database 210, which may be any form of storage, for storing a list of master devices and their associated slave devices. For each device (either master or slave), the database 210 contains identities, associated characteristics (e.g., regulation type, adjacent-channel leakage ratio), corresponding security keys, available channels, and transmission power limits for each device according to its characteristics and locations. The spectrum manager 120 further includes a processor 220 to authenticate the cognitive radio master and slave devices and to determine the spectrum and power allocation based on the content stored in the database 210. The spectrum manager 120 exchanges messages with cognitive radio devices using a communication module 230.

According to certain embodiments of the invention, a slave device 140-$i$ and a master device 110-$j$ implement a handshake process for authentication and authorization of the slave device 140-$i$. With this aim, the master device 110-$j$ communicates with the spectrum manager 120, which verifies the slave device 140-$i$. The spectrum manager 120 further provides the master device 110-$j$ with operation parameters including, but not limited to, operating channels and transmission power according to the type (e.g., handheld or fixed device) and the characteristics (e.g., adjacent-channel leakage ratio) of the slave device 140-$i$. Such information is provided by the spectrum manager based, in part, on contents stored in the database 210. It is noted that a master device communicates directly with the spectrum manager 120 for its own authentication.

In accordance with an embodiment of the invention, authentication of cognitive radio devices, either slave or master, is executed in a secure manner to prevent the authentication of mimic devices.

Figure 3:
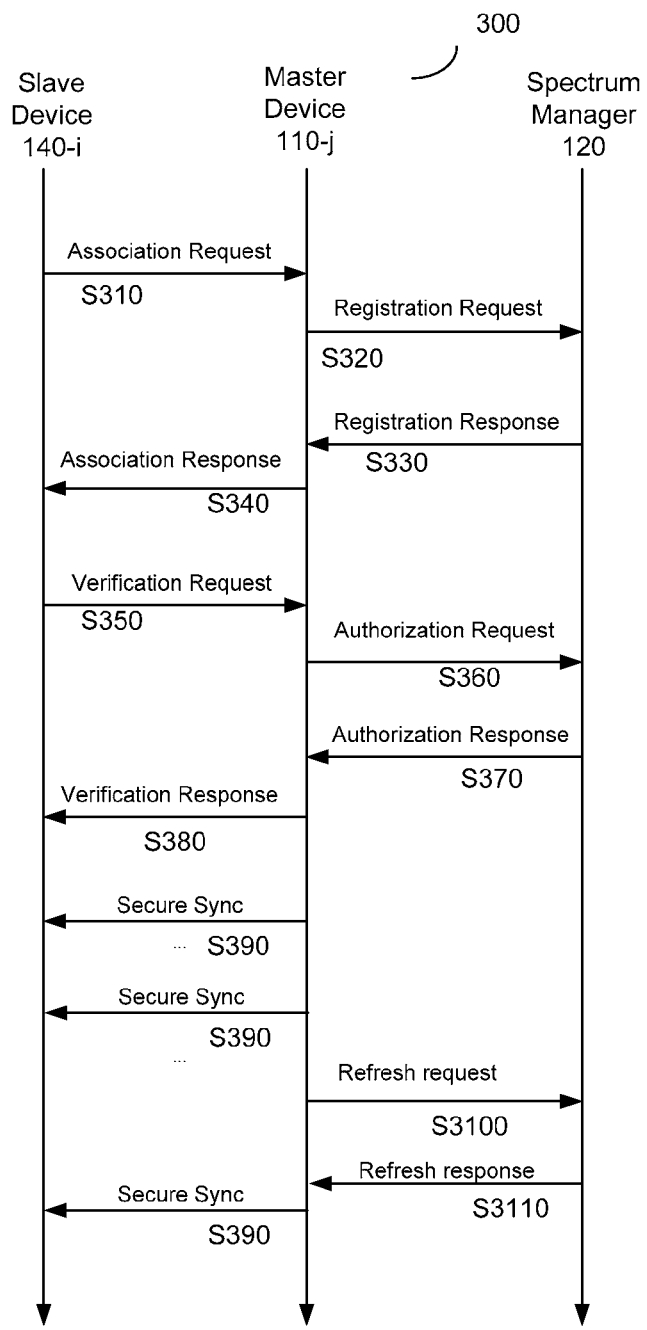
FIG. 3 is a flow diagram illustrating a method of authentication and authorization of a slave device in accordance with an embodiment of the invention.

FIG. 3 shows an exemplary flow diagram 300 illustrating a method of authentication and authorization of a slave device 140-$i$ in accordance with an embodiment of the invention. For the sake of simplicity and without limiting the scope of the invention, the process 300 is directed at authentication and authorization of a single slave device. However, it is noted that the following teachings can be applied for authentication and authorization of multiple slave devices associated with a master device.

At S310, when a slave device 140-$i$ powers up or wakes up, it first sends an Association Request message to the master device 110-$j$. The Association Request message includes, for example, the device identifier (e.g., a FCC ID) and MAC address. The Association Request message may also include the location information of the slave device 140-$i$, if needed. In an embodiment of the invention, the device identifier is stored in the read-only memory in the slave device 140-$i$, to prevent hackers from stealing the identifier.

At S320, upon receiving the Association Request message, the master device 110-$j$ generates a Registration Request message and sends it to the spectrum manager 120. The Registration Request message includes, for example, the master device identifier, its location information, and the device identifier and location information of the slave device 140-$i$.

At S330, the spectrum manager 120 generates a Registration Response message and sends it back to the master device 110-$j$. The Registration Response message includes an encrypted authentication signal which can only be decoded by the slave device 140-$i$. The authentication signal is randomly generated and encrypted by a key corresponding to the slave device 140-$i$. The key could be a public key or a symmetric key for the slave device. It is noted that the slave device 140-$i$ owns the corresponding private key or the symmetric key. The authentication signal is stored in the spectrum manager 120 for later use.

At S340, the master device 110-$j$ sends an Association Response message to the slave device 140-$i$. The Association Response message includes the encrypted authentication signal contained in the Registration Response message received from the spectrum manager 120.

At S350, the slave device 140-i uses its privately owned key to decrypt the encrypted authentication signal in the received Association Response message. The slave device 140-i then generates a Verification Request message and sends this message back to the master device 110-j. The Verification Request message includes at least the decrypted authentication signal.

At S360, the master device 110-j generates and sends an Authorization Request message to the spectrum manager 120. The Authorization Request message contains the decrypted authentication signal, as received from the slave device 140-i.

At S370, the spectrum manager 120 compares the received authentication signal, included in the Authorization Request message, with the copy of the authentication signal generated at S330. If a match exists, the verification/authentication process passes; otherwise, the process fails and execution ends.

When the spectrum manager 120 successfully verifies and authenticates the information at S370, an Authorization Response message is generated and sent to the master device 110-j. The Authorization Response message contains the available channels and transmission power limits for the slave device 140-i to operate. The available channels and power limits are calculated based on the slave device 140-i type and characteristics, as well as the device type and the location of the master device 110-j.

At S380, the master device 110-j generates a Verification Response message and sends this message to the slave device 140-i. The Verification Response message includes the available channels and transmission power limits for the slave device 140-i.

In accordance with an embodiment of the invention, the Verification Response is structured in a format of a Channel Set Information Element (IE) which is part of a Secure Sync IE. The structures of the Secure Sync IE and Channel Set IE are illustrated in FIGS. 4A and 4B, respectively.

In accordance with an embodiment of the invention, the Verification Response message is sent in a secure manner such that only the corresponding verified/authenticated slave device 140-i can decode it. In accordance with another embodiment of the invention, the master device 110-j initiates a 4-way handshake to add the slave device into a secure multicast group.

Figure 5A:
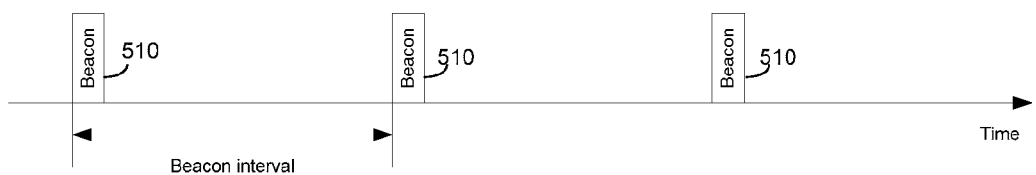
FIGS. 5A and 5B illustrate different embodiments for transmission of the Secure Sync IE.
Figure 5B:
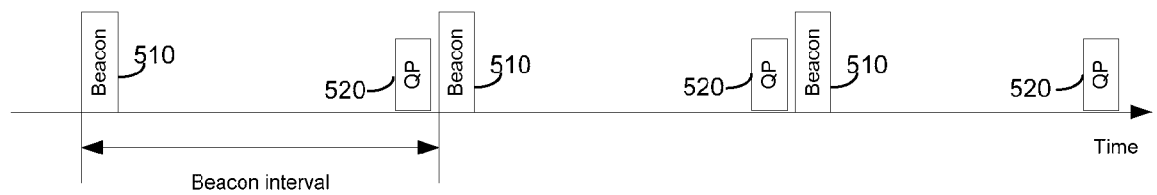

At S390, the master device 110-j periodically multicasts a Secure Sync Information Element (IE) to the slave devices associated with the master device 110-j. In one embodiment, illustrated in FIG. 5A, the Secure Sync IE is included in the beacons 510 periodically transmitted by the master device 110-j. In another embodiment, illustrated in FIG. 5B, the Secure Sync IE is transmitted in the quiet period (QP) 520, which would be otherwise used for performing sensing.

Referring back to FIG. 3, at S3100, the master device periodically sends (e.g., once a day) Refresh Request messages to the spectrum manager 120, requesting an updated list of available channels and transmission power limits for the slave device. Then, at S3110, the spectrum manager 120 returns a Refresh Response message, which includes an updated list of the available channels and power limits for the master device and its associated slave devices.

Upon receiving the Refresh Response message from the spectrum manager 120, if the list of the available channels and power limits for a slave device 140-i changes, the master device 110-j updates the channel set ID and attach Channel Set IE in the Secure Sync IE to reflect the update.

The process described herein is for authentication and authorization of the slave devices. It is noted that master devices perform their own authentication and authorization process with the spectrum manager. That is, authentication and authorization of a master device includes performing steps S320, S330, S360, S370, S3100, and S3110 described above. It is further noted that the processes described in FIG. 3 can be utilized for authentication of a master device by another master device.

Reference is now made to FIG. 4A, where a Secure Sync IE format 400 structured according to an embodiment of the invention is shown. The Secure Sync IE 400 includes the following fields: element identifier (ID) 401, length 402, multicast ID 403, channel set ID 404, and channel set IE 405. The Multicast ID field 403 includes an identifier to designate a multicast group, which includes a plurality of slave devices. The fields 404 and 405 are encrypted. The length field 402 designates whether the Secure Sync IE 400 includes a Channel Set IE, and if so, it specifies the length of the Channel Set IE and the length of the Secure Sync IE; otherwise, the field 402 contains only the length, in bytes, of the Secure Sync IE 400.

FIG. 4B shows a Channel Set IE 405 structured according to an embodiment of the invention. The channel set IE 405 includes the following fields: element identifier (ID) 410, length 420, regulatory domain 430 (e.g., USA, UK, Canada, etc.), number of permissible channels 440, and for each permissible channel, subfield 441 indicating the channel number and a subfield (442) indicating the transmission power limit of the channel.

It is noted that the Secure Sync IE carries an encrypted Channel set ID. To be able to decode the encrypted Channel set ID, the slave device 140-i is part of the secure multicast group, identified in a multicast ID field 403. That is, to render the available channels and transmission power limits according to the Channel set ID, a slave device 140-i has to first receive and decode the Channel Set IE. The Secure Sync IE may also contain the Channel Set IE if needed, for example, after receiving the update of the available channels and power limits from the spectrum manager 120.

Figure 6:
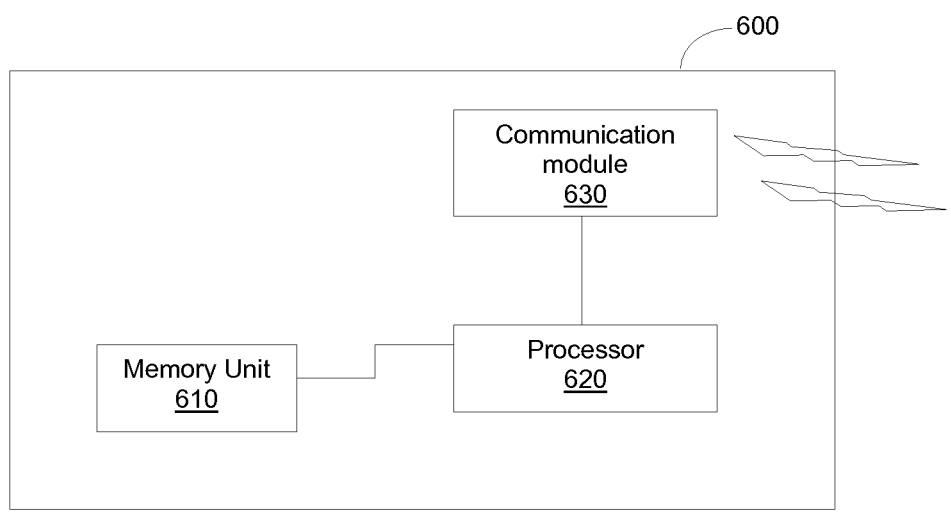
FIG. 6 is a block diagram of a cognitive radio device according to an embodiment of the invention.

FIG. 6 shows a non-limiting and exemplary block diagram of a cognitive radio device 600 that can perform the embodiments of the invention. The device 600 may function as either a slave device or a master device. The cognitive radio device 600 includes a memory unit 610, a processor 620, and a communication module 630 for exchanging messages with at least one of the spectrum manager and other radio devices in the network. The memory unit 610 may include a read-only memory portion for preferably storing the device identity and its private security key, among other things. The memory unit 610 also contains a list of associated devices. For example, if the device 600 is a master device, the memory unit 610 holds a list of slave devices communicating with the device 600.

The processor 620 is configured to operate according to the type of the cognitive radio device 600. Specifically, when operating in a master device mode, the processor 620 is adapted for generating the Registration request, Association Response, Verification response, Secure Sync, and Refresh request messages, as described in detail above. In a slave device mode, the processor 620 is adapted for generating the Association request, Verification request messages, as described in detail above. In both modes, the processor 620 also encrypts and decrypts the messages using the security key.

The foregoing detailed description has set forth a few of the many forms that the invention can take. It is intended that the foregoing detailed description be understood as an illustration of selected forms that the invention can take and not as a limitation to the definition of the invention.

Most preferably, the principles of the invention are implemented as any combination of hardware, firmware, and software. Moreover, the software is preferably implemented as an application program tangibly embodied on a program storage unit or computer readable medium. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform as an additional data storage unit and a printing unit. Furthermore, a non-transitory computer readable medium is any computer readable medium except for a transitory propagating signal.

What is claimed is:

1. A method for authenticating and authorizing a plurality of cognitive radio devices, comprising:
    generating, by an intermediate cognitive radio device, a registration request message that includes an identifier and a location of the intermediate cognitive radio device, wherein the registration request message also includes a location and an identifier of a cognitive radio device to be authenticated;
    sending, by the intermediate cognitive radio device, the registration request message to a spectrum manager;
    receiving, by the intermediate cognitive radio device, a registration response message that includes an encrypted authentication signal that can be decoded by the cognitive radio device;
    generating, by the intermediate cognitive radio device, an authorization request message that includes an authentication signal decrypted from the encrypted authentication signal received from the cognitive radio device;
    upon receiving an authorization response message from the spectrum manager, generating, by the intermediate cognitive radio device, a verification response message that includes at least a list of available channels and transmission power limits set for the cognitive radio device; and
    sending, by the intermediate cognitive radio device, the verification response message to the cognitive radio device, such that the cognitive radio device is authenticated and authorized to communicate on channels designated in the verification response message.

2. The method of claim 1, further comprising:
    receiving, by the intermediate cognitive radio device, an association request message from the cognitive radio device that includes at least one of the identifier, the location and a medium access control address of the cognitive radio device; and
    prior to generating the authorization request message, receiving, by the intermediate cognitive radio device, a verification request message that includes at least a decrypted authentication signal generated by decrypting the authentication signal in the association response message using a private key of the cognitive radio device.

3. The method of claim 1, further comprising:
    periodically generating and sending, by the intermediate cognitive radio device, a secure sync information element to the cognitive radio device; and
    periodically generating and sending, by the intermediate cognitive radio device, a refresh request message to the spectrum manager.

4. The method of claim 3, wherein the secure sync information element is transmitted in at least one of a beacon and a quiet period of a superframe.

5. The method of claim 3, wherein the secure sync information element comprises a multicast identifier, a channel set identifier, and a channel set information element, wherein the multicast identifier designates a multicast group that includes a plurality of cognitive radio devices.

6. The method of claim 5, wherein the channel set identifier and the channel set information element are encrypted, and wherein the cognitive radio device decrypts the channel set information element if the cognitive radio device belongs to the multicast group designated in the multicast identifier.

7. The method of claim 5, wherein the channel set information element includes an element identifier field, a length field, a regulatory domain, number of permissible channels for transmissions, and for each permissible channel a subfield indicating a channel number and a subfield indicating a transmission power limit for a channel.

8. The method of claim 1, wherein the authorization response message is generated by the spectrum manager if the authentication signal included in the authorization request message matches a decrypted copy of the authentication signal included in the registration response message.

9. The method of claim 1, wherein the cognitive radio device is at least one slave device associated with the intermediate cognitive radio device that communicates with the spectrum manager.

* * * * *